United States Patent [19]

Green

[11] 4,252,592

[45] Feb. 24, 1981

[54] METHOD OF MAKING EPOXIDE RESIN-IMPREGNATED COMPOSITES

[75] Inventor: George E. Green, Stapleford, England

[73] Assignee: Ciba-Geigy Corporation, Ardsley, N.Y.

[21] Appl. No.: 918,986

[22] Filed: Jun. 26, 1978

[30] Foreign Application Priority Data

Jul. 5, 1977 [GB] United Kingdom .............. 28141/77

[51] Int. Cl.³ .......................... B29B 1/14; B29D 3/02
[52] U.S. Cl. ................... 156/272; 204/159.11; 204/159.14; 204/159.23; 204/159.24; 427/302; 427/53.1; 427/189; 156/309.6; 156/242
[58] Field of Search .............................. 156/242, 246; 204/159.11, 159.14, 159.23, 159.24; 427/44, 53, 54

[56] References Cited

U.S. PATENT DOCUMENTS

| | | | |
|---|---|---|---|
| 3,784,433 | 1/1974 | Garnish et al. .............. | 156/276 |
| 3,895,954 | 7/1975 | Roteman ..................... | 96/115 R |
| 3,956,041 | 5/1976 | Polichette et al. ............ | 156/246 |
| 3,983,289 | 9/1976 | Nishizaki et al. ............. | 428/268 |
| 4,058,401 | 11/1977 | Crivello ...................... | 96/115 R |
| 4,069,055 | 1/1978 | Crivello ...................... | 204/159.14 |
| 4,092,443 | 5/1978 | Green ........................ | 204/159.11 |
| 4,107,353 | 8/1978 | Karoly et al. ................ | 204/159.14 |
| 4,113,497 | 9/1978 | Schlesinger .................. | 204/159.14 |
| 4,136,102 | 1/1979 | Crivello ...................... | 204/159.23 |

FOREIGN PATENT DOCUMENTS

828669 1/1975 Belgium .
912022 12/1962 United Kingdom .

*Primary Examiner*—Caleb Weston
*Attorney, Agent, or Firm*—Harry Falber

[57] ABSTRACT

A layer of a liquid composition containing an epoxide resin as the sole photopolymerizable component, a heat-activated curing agent for epoxide resins, and preferably a photopolymerization catalyst, is exposed to actinic radiation until the layer solidifies to form an essentially solid, continuous film due to photopolymerization of the epoxide resin through epoxide groups, the resin remaining, however, still thermosettable by virtue of residual epoxide groups. The film so formed is contacted with fibrous reinforcing material and caused to flow about the fibers, suitably by applying heat and pressure, to form a prepreg. When desired, e.g., after the prepreg has been formed into some desired configuration or layers of prepreg have been stacked, the assembly may be cured by further heating.

20 Claims, No Drawings

METHOD OF MAKING EPOXIDE RESIN-IMPREGNATED COMPOSITES

BACKGROUND OF THE INVENTION

This invention relates to a method for the production of reinforced composites from fibrous reinforcing materials and compositions which are photopolymerisable and thermosettable, and to the composites obtained by this method.

Composite structures are commonly made by impregnating fibrous materials, such as fibers of paper, glass, an aromatic polyamide, and carbon, metal filaments, or whiskers, usually in the form of layers, with a solution of a solid thermosettable resin in a volatile solvent and with a heat-activated curing agent for the resin, causing the resin to solidify by evaporation of the solvent, and, when desired, curing the resin composition in the resultant so-called "prepreg" by the action of heat. Frequently, the prepregs are stacked before heat-curing, so that a multilayer laminate is formed.

Composite structures may also be prepared from films of a thermosettable resin composition by the method described in British Pat. No. 1 299 177, which comprises laying a film of the resin composition on a fibrous reinforcement and applying heat and pressure so that the resin composition flows about the fibers but remains curable, and then heating further when desired so that the resin is cured by the heat-activated curing agent. This procedure is particularly convenient when unidirectional fibrous reinforcement is to be used, especially if the fibres are short and/or light, because there is less tendency for the fibres to become displaced and the reinforcing effect thereby become irregularly distributed.

Both these methods, however, suffer from certain drawbacks. If a solvent is used to dissolve components of the thermosettable resin composition, it is not always possible to remove all traces of the solvent before heat-curing takes place, and in consequence the cured composite may contain voids caused by evaporation of residual solvent. Solvents may cause difficulties due to their toxicity or flammability or to pollution. If a film adhesive is used, it is usually cast from a liquid thermosettable resin composition and this is then advanced to the solid state; such a process adds considerably to the cost of the composite. Both methods also require a considerable expenditure of heat energy, either to evaporate the solvents or to advance the resin.

We have now found that fibrous reinforced composites may be made by a procedure which substantially avoids the inconveniences just mentioned. In this novel method, a liquid composition containing an epoxide resin is photopolymerized to form an essentially solid continuous film by exposure to actinic radiation, optionally in the presence of a catalyst for the photopolymerisation, but without thermally crosslinking it; the film so obtained is then contacted with fibrous reinforcing material, usually with the application of heat and/or pressure, such that a coherent structure is formed. The period of heating can be very short, as there need be no solvent to evaporate and the film need not be thick. It is not necessary to convert immediately the photopolymerised composition distributed on the fibrous reinforcing material into the fully cured, insoluble, and infusible C-stage; often, it can be changed into the still fusible B-stage, or remain in the A-stage, and, when desired, e.g., after the prepreg has been formed into some desired configuration, fully cured by heating to form the reinforced composite.

DETAILED DISCLOSURE

The present invention provides a method for the preparation of prepregs which comprises (i) exposing to actinic radiation a layer of a liquid composition containing an epoxide resin as the sole photopolymerisable component and a heat-activated curing agent for epoxide resins, and preferably a catalyst for the photopolymerisation, until the said composition solidifies to form an essentially solid continuous film due to photopolymerisation of the epoxide resin through epoxide groups thereof but which epoxide resin remains substantially in the thermosettable state, and (ii) bringing together the film so formed and fibrous reinforcing material under conditions such that the said film flows about the fibers and the components of the said film and the fibers form a coherent structure.

There are also provided prepregs prepared by the method of this invention.

Other aspects of this invention provides a method of preparing a reinforced composite which comprises heat-curing a photopolymerised, but still thermosettable, prepreg of this invention, and reinforced composites prepared by that method.

The reinforcement may be in the form of woven or non-woven cloth, unidirectional lengths, or chopped strands, and may be of natural or synthetic fibers, including strands and filaments, especially glass, boron, stainless steel, tungsten, silicon carbide, asbestos, an aromatic polyamide such as poly(m-phenylene isophthalamide) or poly(p-phenylene terephthalamide), or carbon, or it may be whiskers of, e.g., potassium titanate.

Compositions used to prepare the films of the present invention must be liquid under the conditions used in making these films but are preferably solvent-free.

Epoxide resins, i.e., substances containing more than one 1,2-epoxide group per average molecule, suitable for use in the present invention are preferably those containing groups of formula

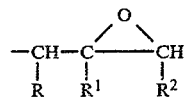

directly attached to an atom or atoms of oxygen, nitrogen, or sulfur, where either R and $R^2$ each represent a hydrogen atom, in which case $R^1$ denotes a hydrogen atom or a methyl group, or R and $R^2$ together represent $-CH_2CH_2-$, in which case $R^1$ denotes a hydrogen atom.

As examples of such resins may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid and dimerised and trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,5-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane (otherwise known as bisphenol F), 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, the derivatives of amines such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin. N-Glycidyl compounds are not preferred when the photopolymerisation or thermal crosslinking stage involves reaction with a Lewis acid.

Examples of poly(S-glycidyl) compounds are di(S-glycidyl) derivatives of dithiols such as ethane-1,2-dithiol and bis(4-mercaptomethylphenyl) ether.

Examples of epoxide resins having groups of formula I where R and $R^2$ conjointly denote a —CH$_2$CH$_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxide resins in which some or all of the epoxide groups are not terminal may also be employed, such as vinylcyclohexene dioxide, limonene dioxide, dicyclopentadiene dioxide, 4-oxatetracyclo[6.2.1.0$^{2,7}$.0$^{3,5}$]undec-9-yl glycidyl ether, the bis(4-oxatetracyclo[6.2.0$^{2,7}$.0$^{3,5}$]undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro[5,5]undecane, and epoxidised butadienes or copolymers of butadiene with ethylenic compounds such as styrene and vinyl acetate.

If desired, a mixture of epoxide resins may be used.

Especially preferred epoxide resins, which may have been advanced, used in the process of this invention are diglycidyl ethers of dihydric phenols such as 2,2-bis(4-hydroxyphenyl)propane and bis(4-hydroxyphenyl)methane and of dihydric alcohols such as of butane-1,4-diol, and N,N'-diglycidyl derivatives of hydantoins, such as 1,3-diglycidyl-5,5-dimethylhydantoin.

The heat-activated curing agent for the epoxide resin may be, for example, a polycarboxylic acid anhydride, dicyandiamide, a complex of boron trifluoride or of boron trichloride with e.g., an amine, such as a tertiary amine, (n-octyldimethylamine, for example), or a primary amine (ethylamine, for example), a latent boron difluoride chelate, an imidazole, such as 2-ethyl-4-methylimidazole or 2-phenylimidazole, or an aromatic polyamine such as bis(4-aminophenyl)methane. Dicyandiamide and the complexes of boron trifluoride or boron trichloride with amines are preferred, since they are effective in only small proportions. The heat-activated curing agent is usually dissolved or suspended in the liquid composition before preparation of the solid film.

Photopolymerisation catalysts suitable for use in the methods of this invention include o-alkylnitrobenzenes, organohalogen compounds, certain chromates and dichromates, and, especially, aromatic 'onium salts, particularly diazonium salts, which liberate a Lewis acid on exposure to actinic radiation.

Suitable aryl diazonium compounds include the fluoroborates of formula II or III

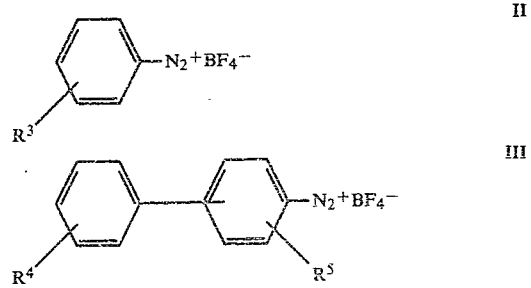

where $R^3$, $R^4$, and $R^5$ each independently represent a hydrogen or a halogen atom or an alkyl, alkoxy, aryl, nitro, or sulphonyl group. Such fluoroborates, and their use in the photoinduced polymerisation of epoxides, are described in U.S. Pat. No. 3,205,157.

Other aryl diazonium fluoroborates which are commercially available and which may be used are of formula

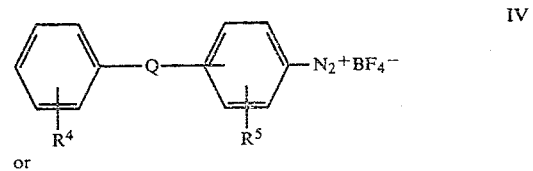

or

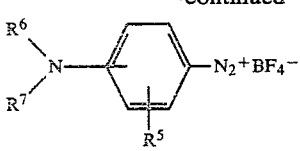

where
R⁴ and R⁵ are as hereinbefore defined,
Q represents an oxygen or sulphur atom or an imino (—NH—) group, and
R⁶ and R⁷ individually represent an alkyl group or, together with the nitrogen atom to which they are attached, represent a saturated or unsaturated 5- or 6-membered heterocyclic residue which may contain an oxygen or sulphur atom or a second nitrogen atom.

Specific suitable diazonium fluoroborates are diphenylamine-4-diazonium fluoroborate, 2,5-diethoxy-4-morpholinobenzenediazonium fluoroborate, 2,5-diethoxy-4-(p-tolylthio)benzenediazonium fluoroborate, 4-(diethylamino)benzenediazonium fluoroborate, 3-methoxy-4-pyrrolidinobenzenediazonium fluoroborate, and 4-morpholinobenzenediazonium fluoroborate.

Yet other suitable aryl diazonium compounds are those of formula

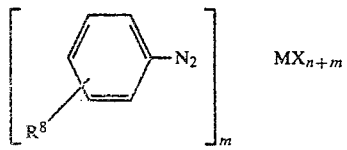

where
R⁸ represents a halogen atom or a nitro, N-morpholino, alkyl, alkoxy, aryl, amino, arylamino, alkylamino, or arylmercapto group,
n is the oxidation state of M,
m is the number of diazonium groups in the diazonium salt, and
$MX_{n+m}$ represents hexachlorostannate, tetrachloroferrate, hexafluorophosphate, hexafluoroarsenate, hexachloroantimonate, hexafluoroantimonate, or pentachlorobismuthate.

These compounds, and their use for photopolymerising epoxides, are described in British Pat. No. 1,321,263.

Suitable other aromatic 'onium salts which liberate a Lewis acid on exposure to actinic radiation are aromatic salts of groups VA and VIA elements of the Periodic Table, such as aromatic ammonium, arsonium, phosphonium, sulphonium, and selenonium tetrafluoroborates and hexafluorophosphates, and aromatic halogenonium salts such as aromatic iodonium tetrafluoroborates, hexafluorophosphates, hexafluoroantimonates, hexachloroantimonates, tetrachlorostannates, tetrachloroferrates, pentachlorobismuthates, hydrogen sulphates, nitrates, and hexafluoroarsenates. The preferred aromatic groups are phenacyl and phenyl groups. A specific example of such an 'onium salt is bis(3-nitrophenyl)iodonium hexafluoroarsenate.

Such compounds and their use for photopolymerising epoxides are described in Belgian Pat. Nos. 828 668, 828 669 and 828 670.

In each of the three aforesaid Belgian patent specifications it is states that the compositions may be cured by radiation such as ultraviolet light, by heat, or by a combination of both, since the curing agent may be activated by radiation or by heat. There is no disclosure, however, of the use of the 'onium salt together with another, heat-curing agent. Each states that the compositions can be used in the production of, inter alia, laminates and impregnated tapes, and has at least one Example describing the production of a fibre-reinforced composite. Thus, the first describes the preparation of a composite, suitable for use in the manufacture of circuit boards, by impregnating two pieces of glass fibre fabric with a composition containing a polyglycidyl ether of a novolac resin, 4-vinylcyclohexene dioxide, and N-phenacylacridinium tetrafluoroborate, stacking the impregnated fabrics together, and exposing the assembly to ultraviolet radiation to cure the composition. The second describes the preparation of a composite ring for use in electric motors by impregnating a glass fibre tape with a composition containing 3,4-epoxycyclohexylmethyl 3,4-epoxycyclohexanecarboxylate and di-p-tolyliodonium tetrafluoroborate, winding the impregnated tape around a drum, and exposing it to ultraviolet radiation to cure the composition. The third describes the preparation of a glass fabric-reinforced laminate for use in the production of circuit boards by a method similar to that described in the first Specification but using triphenylsulphonium hexafluoroantimonate in place of the acridinium salt. In the third Specification a cylindrical composite is made by impregnating a glass fabric tape with a composition containing bisphenol A diglycidyl ether, 4-vinylcyclohexene dioxide and phenacyltetramethylsulfonium hexafluoroarsenate, winding the impregnated tape onto a mandrel, and exposing the tape to ultraviolet light to cure the composition.

None of these specifications, however, discloses exposing the compositions to ultraviolet radiation to solidify them whilst leaving them still curable by heat, and there is no indication that the resinous components of the composite products prepared as described are thermosettable or flowable.

Other suitable onium salts are sulfonium or iodonium salts of a sulfonic acid such as those described in West German Offenlegungsschrift No. 2 731 396. These salts may be of the formula

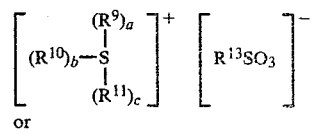

or

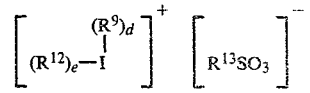

where
R⁹ is a monovalent aromatic organic group,
R¹⁰ is a monovalent alkyl, cycloalkyl, or substituted alkyl group,
R¹¹ is an aliphatic or aromatic residue forming with the indicated sulfur atom a heterocyclic structure which may contain a condensed ring,
R¹² is a divalent aromatic residue,
a is zero or an integer of 1 to 3,
b is zero, 1, or 2,
c is zero or 1, such that a+b+c is 3,
d is zero or 2, e is zero or 1, such that one, but not both, of d and e is zero, R$^{13}$ is an aromatic hydrocarbon residue of 6 to 13 carbon atoms (such as a phenyl, a tolyl, or a xylyl group), which may be substituted by halogen atoms (such as a chlorophenyl group), an alkyl group of 1 to 8 carbon atoms (such as a methyl, ethyl, or n-propyl group), which may be substituted by halogen atoms (such as a trifluoromethyl group), or a fluorine atom.

Specific examples of such sulphonium salts are triphenylsulphonium fluorosulphonate, triphenylsulphonium trifluoromethanesulphonate, and triphenylsulphonium toluene-p-sulphonate. Specific examples of iodonium salts are diphenyliodonium fluorosulphonate and its trifluoromethanesulphonate.

According to the above-mentioned Offenlegungsschrift, epoxide resins may be cured by exposure to ultraviolet radiation in the presence of these sulphonium or iodonium salts, followed by thermal treatment at temperatures up to 149° C. It is stated that the compositions can be used, inter alia, as adhesives and coatings, and may be applied to various substrates, including textiles. Although it explicitly discloses ultraviolet exposure followed by heating to complete cure, it is not suggested that the compositions can be solidified by exposure to ultraviolet radiation and subsequently thermally cured. Indeed, the disclosures suggest that the exposure to ultraviolet radiation merely acts to release the sulphonic acid and that it is necessary to heat the composition to solidify it.

o-Alkylnitrobenzenes useful for photopolymerising epoxides are those of formula

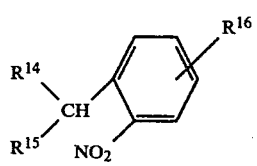

IX where

R$^{14}$ and R$^{15}$ each represent a hydrogen atom or an alkyl, aryl, carbalkoxy, pyridyl, carbazolyl, N-oxidopyridyl, nitroalkyl, nitroaryl, alkaryl, aralkyl, haloalkyl, or haloaryl group, and R$^{16}$ represents a hydrogen atom or an alkyl, aryl, nitroalkyl, nitroaryl, alkaryl, aralkyl, haloalkyl, or haloaryl group.

Such nitrobenzenes and their use for photopolymerising epoxides are described in West German Offenlegungsschrift No. 2 361 141.

Mixtures of an organohalogen compound containing alkyl, aryl, alkaryl, aralkyl, alkoxy, or aryloxy groups, and an organometalloidal compound of formula $(R^{17})_3E$  X where each R$^{17}$ represents a hydrogen atom or hydrocarbon group such that at least one group R$^{17}$ is a hydrocarbon group, and E represents a phosphorus, antimony, arsenic, or bismuth atom, e.g., a mixture of iodoform and triphenylbismuthine, are described in U.S. Pat. No. 3 895 954, as is their use for photopolymerising epoxides.

Use of an alkali metal, alkaline earth metal or ammonium chromate or dichromate, or a polyhalogenated organic compound that yields a halogen-free radical at a relatively low bond dissociation energy, such as iodoform, carbon tetrabromide, tetrabromo-o-cresol, a tetrachlorobenzene, a tetrabromobutane, or carbon tetrachloride, for the photopolymerisation of epoxides is described in U.S. Pat. No. 3 782 952.

The amount of photopolymerisation catalyst present is generally from 0.1 to 20 parts by weight per 100 parts by weight of the epoxide resin, 1 to 10 parts by weight being preferred. The amount of heat-activated curing agent is generally from 0.5 to 20 parts by weight, and preferably 1 to 10 parts by weight, per 100 parts by weight of the epoxide resin.

In the photopolymerising step actinic radiation of wavelength from 200 to 600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure will depend upon a variety of factors which include, for example, the individual epoxide resin used, the type of light source, and its distance from the polymerising layer. Suitable times may be readily determined by those familiar with photopolymerisation techniques, but the product so photopolymerised must still be curable by heating. Of course, irradiation is carried out at a temperature below that at which substantial heat-curing would occur.

The temperature and duration of heating required for the curing of the epoxide resin are readily found by routine experimentation and, in any case, are already well known for those thermally-activated crosslinking agents commonly available.

The epoxide resin, the heat-activated curing agent, and, if used, the catalyst for the photopolymerisation, are preferably applied so that the prepreg contains a total of from 20 to 80% by weight of the said components, and, correspondingly, 80 to 20% by weight of the reinforcement. More preferably, a total of 30 to 50% by weight of these components and 70 to 50% by weight of the reinforcement are employed.

Products made in accordance with the present invention may be in the form of flat sheets or shaped articles.

As already indicated, the components of the film are caused to flow about the fibrous reinforcing material by applying heat and/or pressure. Heated platens or pairs of rollers may be used, for example, and in the latter case, when unidirectional fibres are used, a rolling pressure may be applied in the direction of the fibre alignment. In place of pairs of rollers, the assembly may be passed under tension around part of the periphery of a single roller.

The film may be provided with a strippable backing sheet, e.g., of a polyolefin or a polyester, or of cellulosic paper having a coating of a silicone as release agent, on the face opposite to that brought into contact with the fibrous reinforcement. Manipulation of the assembly is often easier if the film has a tacky surface. This may be produced by coating the film with a substance which is tacky at room temperature but which cures to a hard, insoluble, infusible resin under the conditions of heat employed to cure the epoxide resin component of the film. However, an adequate degree of tackiness often exists without additional treatment, especially if the epoxide resin is not too far advanced.

The prepreg may be made by a batch process, the fibrous reinforcing material being laid on the film of the photopolymerised composition which is advantageously under slight tension, when a second such film may, if desired, be laid on top and then the assembly is pressed while being heated.

The prepregs may also be made continuously, such as by contacting the fibrous reinforcing material with the film of the photopolymerised composition, then, if desired, placing a second such film on the reverse face of the fibrous reinforcing material and applying heat and pressure. More conveniently, two such films, preferably supported on the reverse sides by belts or strippable sheets, are applied simultaneously to the fibrous reinforcing material so as to contact each exposed face. When two such films are applied, they may be the same or different.

Multilayer prepregs may be made by heating under pressure interleaved films and layers of one or more fibrous reinforcing materials.

When unidirectional fibres are used as the reinforcement material, successive layers of them may be oriented to form cross-ply prepregs.

With the fibrous reinforcing material there may be used additional (non-fibrous) types of reinforcement such as a foil of a metal (e.g., aluminium, steel, or titanium) or a sheet of a plastics material (e.g., an aromatic or aliphatic polyamide, a polyimide, a polysulphone, or a polycarbonate) or of a rubber (e.g., a neoprene or acrylonitrile rubber).

The following Examples illustrate the invention. Temperatures are in degrees Celsius and, unless otherwise indicated, parts are by weight. Epoxide contents were determined by titration against a 0.1 N solution of perchloric acid in glacial acid in the presence of excess of tetraethylammonium bromide, crystal violet being used as the indicator. All flexural strengths quoted are the mean of three results and were determined according to BS 2782, Method 304B.

EXAMPLE 1

A mixture of 100 parts of bisphenol A diglycidyl ether (epoxy value 5.3 equiv./kg), 5 parts of diphenylamine-4-diazonium fluoroborate, and 3 parts of dicyandiamide was blended on a triple roll mill. This flowable composition was used to make a film by coating siliconised paper with it (36 μm thick) and irradiating for 1 minute with a 400 w high pressure metal halide quartz arc lamp providing radiation primarily in the 365 nm waveband. The film was then used to prepare a prepreg by pressing a layer on both sides of a woven cloth consisting of poly(p-phenylene terephthalamide) fibres at 100° for 10 minutes under an applied pressure of 0.07 $MN/m^2$.

A 4-ply laminate was produced by pressing four 10 cm-square pieces of the prepreg at 170° for 1 hour at an applied pressure of 1.4 $MN/m^2$. The laminate, which consisted of 71% of the polyamide fibres, had a flexural strength of 499 $MN/m^2$.

EXAMPLE 2

A liquid composition was prepared by dissolving 5 parts of diphenylamine-4-diazonium fluoroborate and 4 parts of the boron trichloride complex of n-octyldimethylamine in 100 parts of bisphenol A diglycidyl ether. A film was made from this composition using the procedure described in Example 1, and the film was then used to prepare a prepreg by pressing a layer on both sides of carbon fibres (unidirectional, 1.8 tows/cm, weight of tow 0.2 g/m) at 100° for 5 minutes under an applied pressure of 0.07 $MN/m^2$.

A 6-ply laminate was produced by pressing six 10 cm-square pieces of the prepreg at 170° for 1 hour at an applied pressure of 1.4 $MN/m^2$. The laminate, which consisted of 47.5% of carbon fibres, had a flexural strength at 226 $MN/m^2$.

EXAMPLE 3

A liquid composition was prepared by dissolving 5 parts of diphenyl-4-diazonium fluoroborate and 5 parts of the boron trifluoride complex of monoethylamine in 100 parts of diglycidyl hexahydrophthalate. This composition was used to prepare a film as described in Example 1, but irradiating for 10 minutes. The film was then used to prepare a prepreg by pressing a layer onto both sides of a woven glass cloth (epoxysilane treated, plain weave, 200 $g/m^2$) at 100° for 5 minutes under an applied pressure of 0.07 $MN/m^2$.

A 6-ply laminate was produced by pressing six 10 cm-square pieces of the prepreg at 170° for one hour at an applied pressure of 1.4 $MN/m^2$.

EXAMPLE 4

A mixture of 100 parts bisphenol A diglycidyl ether (epoxide content 5.2 equiv./kg), 5 parts of bis(3-nitrophenyl)iodonium hexafluoroarsenate, and 5 parts of the complex of boron trichloride with n-octyldimethylamine was applied as a coating 36 μm thick on siliconised paper, and the layer was irradiated for 20 seconds with the lamp used in Example 1. A prepreg was prepared by pressing the film onto both sides of a woven glass cloth as in Example 3 but at a temperature of 120°.

A six-ply laminate was made as in Example 3; it comprised 42.2% of glass and its flexural strength was 248 $MN/m^2$.

What is claimed is:

1. A method for the preparation of composite structures which comprises
    (i) exposing to actinic radiation a layer of a liquid composition containing an epoxide resin as the sole photopolymerisable component and a heat-activated curing agent for epoxide resins until the said composition solidifies to form an essentially solid continuous film due to photopolymerisation of the epoxide resin through epoxide groups thereof but which epoxide resin remains substantially in the thermosettable state, and
    (ii) bringing together the film so formed and fibrous reinforcing material under conditions such that the said film flows about the fibers and the components of the said film and the fibers form a coherent structure.

2. The method of claim 1, in which the epoxide resin contains at least one group of formula

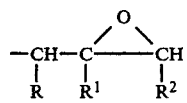

directly attached to an atom of oxygen, nitrogen, or sulfur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

3. The method of claim 1, in which the epoxide resin is a diglycidyl ether of a dihydric phenol or of a dihydric alcohol, an N,N'-diglycidyl derivative of a hydantoin, an advanced such diglycidyl ether, or an advanced such N,N'-diglycidyl derivative of a hydantoin.

4. The method of claim 1, in which the said heat-activated curing agent is a polycarboxylic acid anhydride, dicyandiamide, a complex of boron trifluoride or of boron trichloride, a latent boron difluoride chelate, an imidazole, or an aromatic polyamine.

5. The method of claim 1, in which the said heat-activated curing agent comprises from 0.5 to 20 parts by weight per 100 parts by weight of the epoxide resin.

6. The method of claim 1, in which the said composition also contains a photopolymerisation catalyst.

7. The method of claim 6, in which the photopolymerisation catalyst comprises from 0.1 to 20 parts by weight per 100 parts by weight of the epoxide resin.

8. The method of claim 6, in which the photopolymerisation catalyst is an aromatic 'onium salt which liberates a Lewis acid on exposure to actinic radiation.

9. The method of claim 6, in which the photopolymerisation catalyst is a diazonium salt.

10. The method of claim 6, in which the photopolymerisation catalyst is of the formula

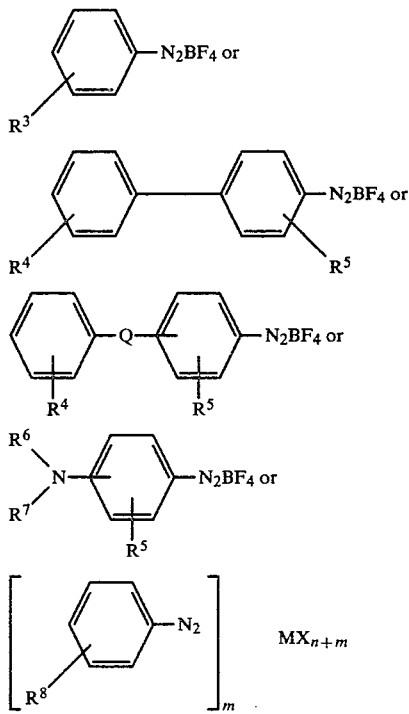

where
R³, R⁴, and R⁵ independently each represent a hydrogen or halogen atom or an alkyl, alkoxy, aryl, nitro, or sulfonyl group,
Q represent an oxygen or sulfur atom or an imino group,
R⁶ and R⁷ individually represent an alkyl group or, together with the nitrogen atom to which they are attached, represent a saturated or unsaturated 5- or 6-membered mononuclear heterocyclic residue, a saturated or unsaturated 5- or 6-membered mononuclear heterocylic residue also containing in the ring an oxygen atom, a saturated or unsaturated 5- or 6-membered mononuclear heterocyclic residue also containing in the ring a sulfur atom, or a saturated or unsaturated mononuclear heterocyclic residue containing in the ring a second nitrogen atom,
$R^8$ represent a halogen atom or a nitro, N-morpholino, alkyl, alkoxy, aryl, amino, arylamino, alkylamino, or arylmercapto group,
n is the oxidation state of M,
m is the number of diazonium groups in the diazonium salt, and
$MX_{n+m}$ represents hexachlorostannate, tetrachloroferrate, hexafluorophosphate, hexafluoroarsenate, hexachloroantimonate, hexafluoroantimonate, or pentachlorobismuthate.

11. The method of claim 6, in which the photopolymerisation catalyst is an aromatic ammonium, arsonium, phosphonium, sulfonium, or selenonium tetrafluoroborate or hexafluorophosphate.

12. The method of claim 6, in which the photopolymerisation catalyst is an aromatic halogenonium salt.

13. The method of claim 6, in which the photopolymerisation catalyst is an aromatic iodonium tetrafluoroborate, hexafluorophosphate, hexafluoroantimonate, hexachlorantimonate, tetrachlorostannate, tetrachloroferrate, pentachlorobismuthate, hydrogen sulfate, nitrate, or hexafluoroarsenate.

14. The method of claim 6, in which the photopolymerisation catalyst is a sulfonium or iodonium salt of a sulfonic acid.

15. The method of claim 6, in which the photopolymerisation catalyst is a sulfonium salt of the formula

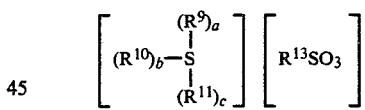

or an iodonium salt of the formula

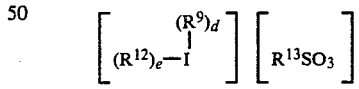

where
$R^9$ is a monovalent aromatic organic group,
$R^{10}$ is a monovalent alkyl, cycloalkyl, or substituted alkyl group,
$R^{11}$ is an aliphatic or aromatic residue forming, with the indicated sulfur atom, a heterocyclic structure which may contain a condensed ring,
$R^{12}$ is a divalent aromatic residue,
a is zero or an integer of 1 to 3,
b is zero, 1, or 2,
c is zero or 1, such that the sum of a+b+c is 3,
d is zero or 2,
e is zero or 1, such that one, but not both, of d and e is zero, and $R^{13}$ is a fluorine atom, an aromatic hydrocarbon residue of 6 to 13 carbon atoms, an aromatic residue consisting of halogen atoms, hydrogen atoms, and from 6 to 13 carbon atoms, an alkyl group of 1 to 8 carbon atoms, or a halogen-substituted alkyl group of 1 to 8 carbon atoms.

16. The method of claim 6, in which the photopolymerisation catalyst is an o-alkylnitrobenzene.

17. The method of claim 6, in which the photopolymerisation catalyst is of the formula

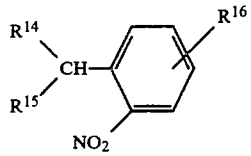

where
$R^{14}$ and $R^{15}$ each represent a hydrogen atom or an alkyl, aryl, carbalkoxy, pyridyl, carbazolyl, N-oxidopyridyl, nitroalkyl, nitroaryl, alkaryl, aralkyl, haloalkyl, or haloaryl group, and $R^{16}$ represents a hydrogen atom or an alkyl, aryl, nitroalkyl, nitroaryl, alkaryl, aralkyl, haloalkyl, or haloaryl group.

18. The method of claim 5, in which the photopolymerisation catalyst is a mixture of an organohalogen compound containing alkyl, aryl, alkaryl, aralkyl, alkoxy, or aryloxy groups and an organometalloidal compound of formula $(R^{17})_3E$ where
each $R^{17}$ represents a hydrogen atom or hydrocarbon group such that at least one group $R^{17}$ is a hydrocarbon group and
E represents a phosphorus, antimony, arsenic, or bismuth atom.

19. The method of claim 6, in which the photopolymerisation catalyst is a chromate or dichromate of an alkali metal, an alkaline earth metal, or ammonium.

20. The method of claim 6, in which the photopolymerisation catalyst is a polyhalogenated organic compound that yields a halogen-free radical at a relatively low bond dissociation energy.

* * * * *